(12) United States Patent
Endo

(10) Patent No.: US 7,471,811 B2
(45) Date of Patent: Dec. 30, 2008

(54) IMAGE PICKUP APPARATUS AND FINGERPRINT RECOGNITION APPARATUS

(75) Inventor: Toshiaki Endo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/680,948

(22) Filed: Mar. 1, 2007

(65) Prior Publication Data
US 2007/0147668 A1    Jun. 28, 2007

Related U.S. Application Data

(62) Division of application No. 10/442,234, filed on May 21, 2003, now abandoned.

(30) Foreign Application Priority Data

Jun. 11, 2002   (JP) ............................. 2002-170125

(51) Int. Cl.
   *G06K 9/00*   (2006.01)
(52) U.S. Cl. ....................................... 382/124
(58) Field of Classification Search ................ None
   See application file for complete search history.

(56) References Cited

U.S. PATENT DOCUMENTS

| | | | |
|---|---|---|---|
| 4,246,568 A * | 1/1981 | Peterson ..................... | 382/126 |
| 4,783,836 A | 11/1988 | Takashima .................. | 382/274 |
| 5,233,442 A | 8/1993 | Kawai et al. ................ | 358/482 |
| 5,272,548 A | 12/1993 | Kawai et al. ................ | 358/482 |
| 5,317,406 A | 5/1994 | Kobayashi et al. .......... | 348/307 |
| 5,335,094 A | 8/1994 | Kaifu et al. ................. | 358/494 |
| 5,521,640 A * | 5/1996 | Prater ......................... | 348/273 |

(Continued)

FOREIGN PATENT DOCUMENTS

JP       3-9660       1/1991

(Continued)

OTHER PUBLICATIONS

U.S. Appl. No. 09/444,675, filed Nov. 22, 1999, Koizumi et al.

(Continued)

*Primary Examiner*—Matthew C Bella
*Assistant Examiner*—Alex Liew
(74) *Attorney, Agent, or Firm*—Fitzpatrick, Cella, Harper & Scinto

(57) ABSTRACT

An image pickup apparatus is provided which performs correction of shading without performing correction of an image signal with a complicated algorithm or a large-scale correction circuit. The image pickup apparatus includes light irradiation unit that irradiates light on an object of image pickup and an image pickup element that receives reflected light or transmitted light from the object of image pickup to generate an electric signal corresponding to an amount of received light, in which a light receiving condition of a pixel of the image pickup element is changed such that shading of a signal from the image pickup element is corrected. The light receiving condition is changed by changing areas of opening portions of pixels 10-1 to 10-5 of the image pickup element, a shape of a lens provided on the opening parts, or an impurity concentration in a photoelectric conversion region of the image pickup element, or changing storage time, storing being performed through driving of the image pickup element.

4 Claims, 7 Drawing Sheets

U.S. PATENT DOCUMENTS

| | | | |
|---|---|---|---|
| 5,587,832 A | 12/1996 | Krause | 359/385 |
| 5,881,184 A * | 3/1999 | Guidash | 382/321 |
| 5,914,485 A | 6/1999 | Kobayashi et al. | 250/208.1 |
| 6,034,406 A | 3/2000 | Kobayashi et al. | 257/435 |
| 6,297,493 B1 | 10/2001 | Kobayashi et al. | 250/214 |
| 6,476,867 B1 | 11/2002 | Kobayashi et al. | 348/307 |
| 6,671,392 B1 | 12/2003 | Shigematsu et al. | 382/124 |
| 6,980,244 B1 | 12/2005 | Yonemoto et al. | 348/302 |
| 7,016,072 B1 * | 3/2006 | Yamazaki | 358/1.9 |
| 7,123,755 B2 * | 10/2006 | Shigeta | 382/124 |
| 7,263,216 B2 * | 8/2007 | Shishido et al. | 382/149 |
| 2003/0103686 A1 * | 6/2003 | Ogura | 382/321 |

FOREIGN PATENT DOCUMENTS

| | | |
|---|---|---|
| JP | 5081412 | 4/1993 |
| JP | 6140612 | 5/1994 |
| JP | 10105708 | 4/1998 |
| JP | 11-239299 | 8/1999 |

OTHER PUBLICATIONS

U.S. Appl. No. 09/363,029, filed Jul. 29, 1999, Endo.
U.S. Appl. No. 08/815,532, filed Mar. 12, 1997, Endo et al.

* cited by examiner

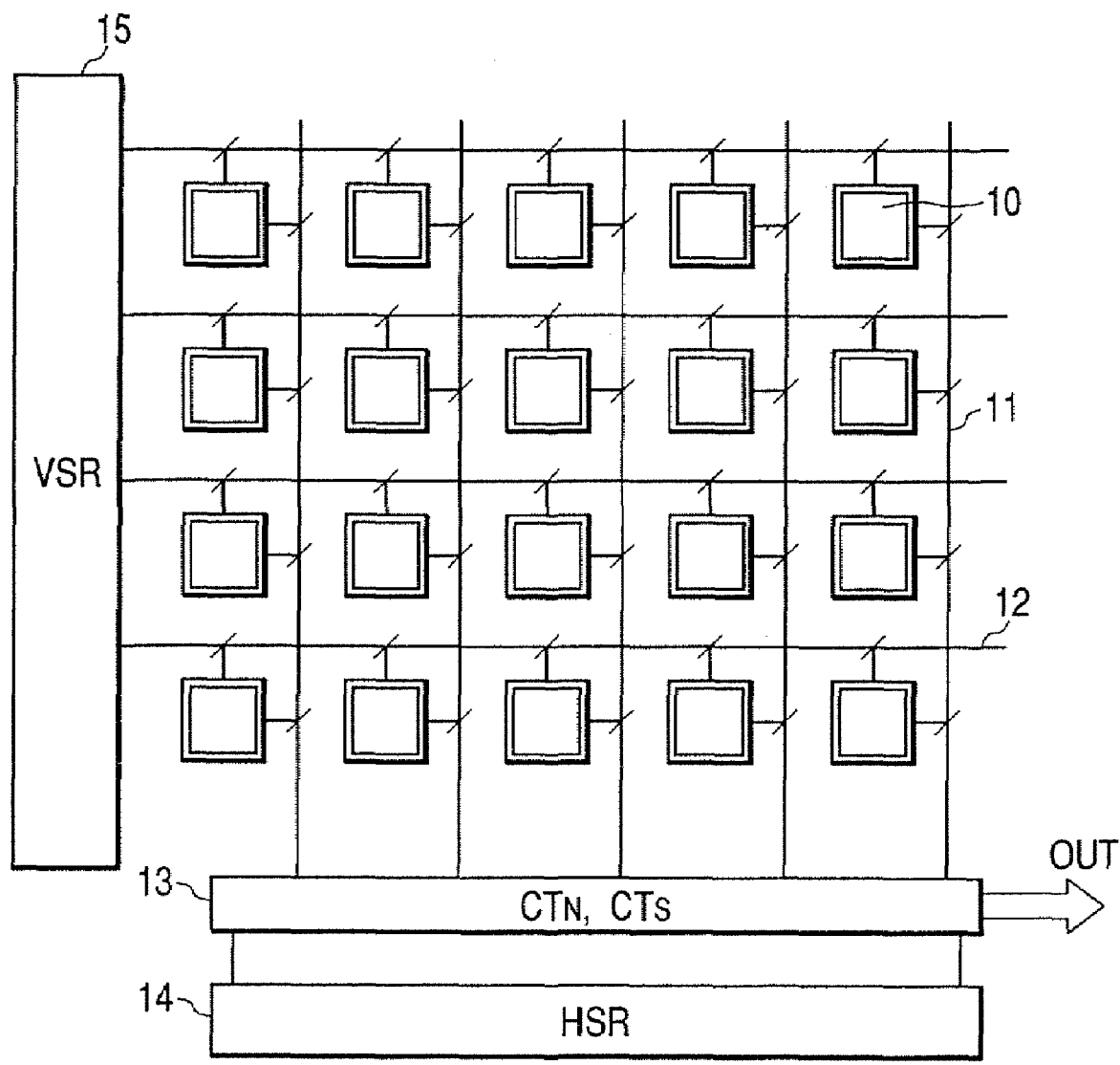

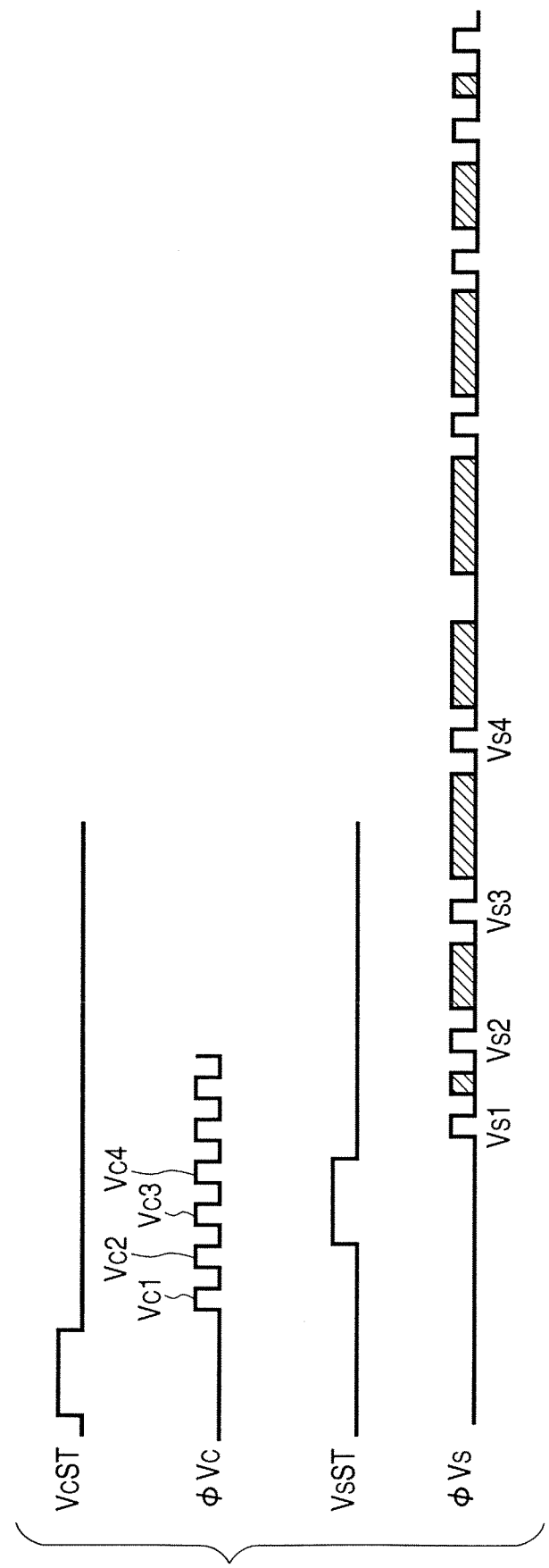

IMAGE PICKUP APPARATUS AND FINGERPRINT RECOGNITION APPARATUS

This application is a division of U.S. patent application Ser. No. 10/442,234, filed on May 21, 2003.

BACKGROUND OF THE INVENTION

1. Field of the Invention

The present invention relates to an image pickup apparatus and a fingerprint recognition apparatus, and in particular to an image pickup apparatus and a fingerprint recognition apparatus which have a light irradiation unit for irradiating light to a photographing object and an image pickup element for receiving reflected light or transmitted light from the photographing object and generating an electric signal corresponding to an amount of received light.

2. Related Background Art

Conventionally, as a fingerprint collation apparatus, for example, Japanese Patent Application Laid-Open No. 5-81412 discloses one in which a microcomputer corrects a trapezoidal distortion of a fingerprint image for registration or collation according to a magnification representing a degree of distortion, which is determined from a trapezoidal distortion of a reference figure photographed image based upon a reference figure, and after setting this corrected fingerprint image as a registered fingerprint image or a collated fingerprint image, collates both the reference figure photographed image and the registered fingerprint image or the collated fingerprint image. In addition, Japanese Patent Application Laid-Open No. 10-105708 discloses an image collation apparatus which is applied to, for example, a fingerprint collation apparatus and, when converting a video signal into a binarization signal based upon a predetermined threshold value to judge conformity or non-conformity between first and second images, corrects a signal level of this threshold value to correct unevenness of an amount of light in an optical system.

However, there is a problem in that the above-mentioned fingerprint collation apparatus needs a complicated arithmetic circuit and a large-scale memory in order to perform data correction, which leads to lengthening of processing time and increase in costs.

SUMMARY OF THE INVENTION

An image pickup apparatus according to the present invention includes: light irradiation means that irradiates light on an object of image pickup; and an image pickup element that receives reflected light or transmitted light from the object of image pickup to generate an electric signal corresponding to an amount of received light, and is characterized in that a light receiving condition of a pixel of the image pickup element is changed such that shading of a signal from the image pickup element is corrected.

In the image pickup apparatus, it is desirable that the light receiving condition is determined by a pixel structure of the image pickup element, in particular, an area of an opening portion, a shape of a lens provided on the opening portion, or an impurity concentration in a photoelectric conversion region of the image pickup element.

Further, it is desirable that the light receiving condition is a storage time, during a driving of the image pickup element. The storage time is controlled by, for example, controlling the image pickup element with an electronic shutter.

A fingerprint recognition apparatus according to the present invention includes, as fingerprint image input means, the above-mentioned image pickup apparatus of the present invention.

A fingerprint recognition apparatus according to the present invention includes an image sensor that irradiates light on a finger and receives the light transmitted through or reflected on the finger to convert the received light into an image signal, in which image signal shading due to unevenness of luminance and an illumination environment of a light source or a shape and a position of a finger can be corrected by controlling a light-receiving condition (sensor pixel structure, storage time control, etc.) in one frame scanning.

For example, in a fingerprint recognition apparatus in which one LED for illumination is arranged in the vicinity of a center on each side in a vertical scanning direction of an image sensor, a longitudinal direction of a finger is aligned with the vertical scanning direction of the sensor to take in a fingerprint image. At this point, since light is transmitted through the inside of the finger to be incident on the sensor side in a central part in the vertical scanning direction, an amount of light is reduced in a part closer to the central part.

Therefore, in a first preferred embodiment of the present invention, a pixel structure, for example, areas (shapes) of opening portions of sensor pixels are changed, and openings are made larger toward the vicinity of the central part in the vertical scanning direction where an amount of light is reduced and made smaller in the vicinity of a peripheral part in the vertical scanning direction where an amount of light is large, whereby shading in the plane is corrected.

In addition, in a second preferred embodiment of the present invention, an electronic shutter pulse is controlled such that the storage time is long in the central part and short in the peripheral part, whereby shading in the sensor vertical scanning direction is corrected.

BRIEF DESCRIPTION OF THE DRAWINGS

In the accompanying drawings:

FIG. 3 is a diagram schematically showing a solid-state image pickup element to be a comparative example in the first embodiment and also schematically showing a solid-state image pickup element of the present invention according to a second embodiment;

FIG. 8 is a timing chart for explaining the operation of the electronic shutter pulse used in the second embodiment.

DETAILED DESCRIPTION OF THE PREFERRED EMBODIMENTS

Embodiments of the present invention will be hereinafter described in detail with reference to the accompanying drawings.

First Embodiment

Figure 4A:
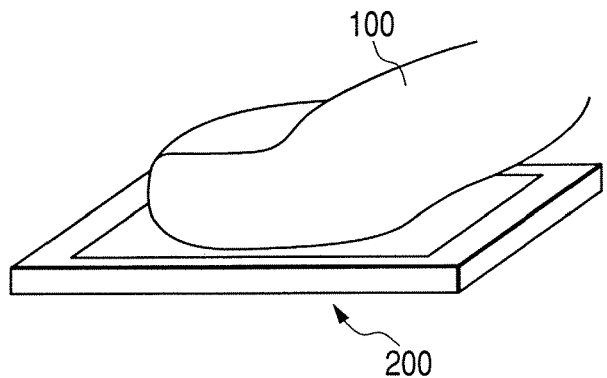
FIG. 4A is a perspective view of a fingerprint image input device of a fingerprint recognition apparatus of the present invention.
Figure 4B:
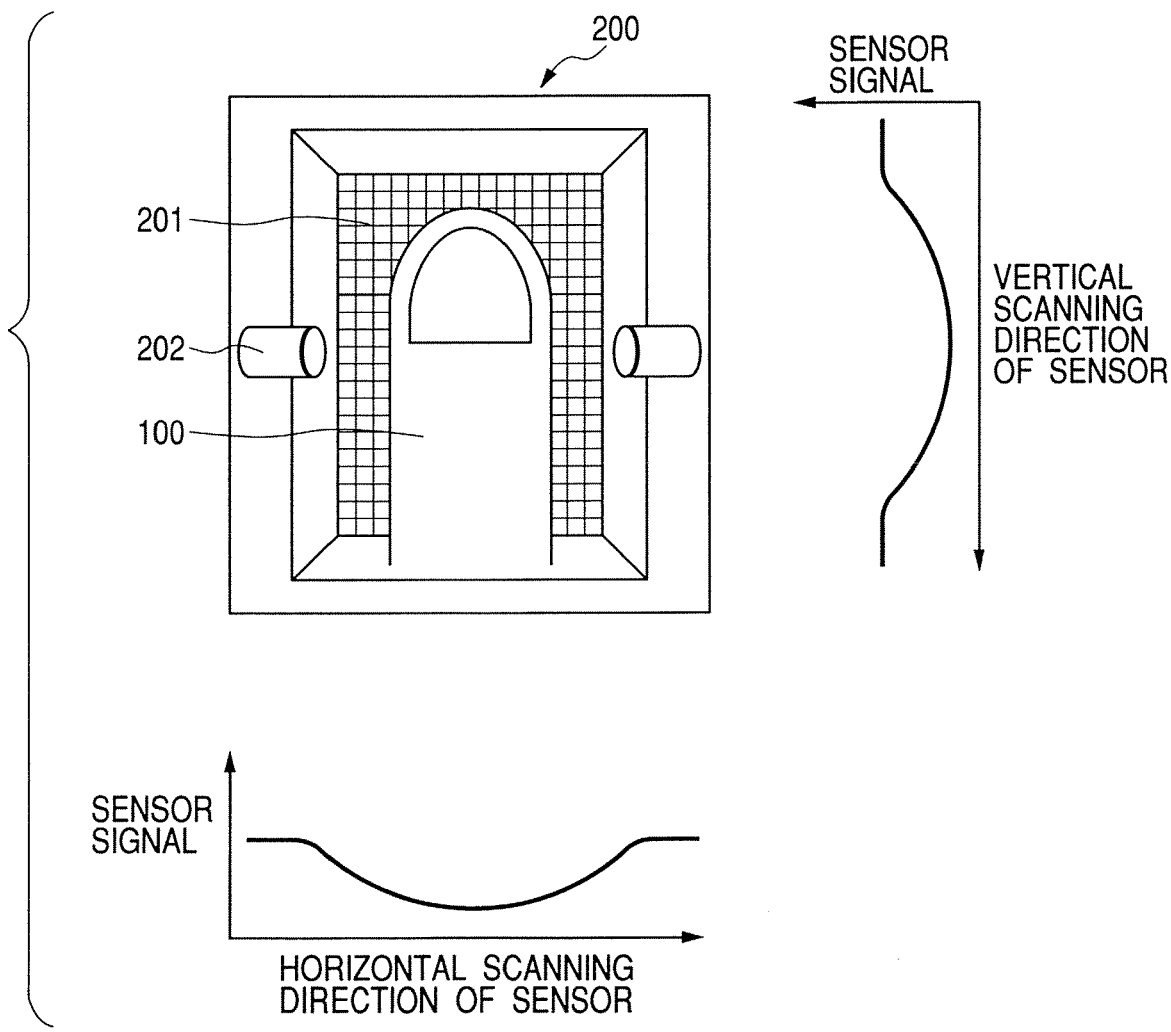
FIG. 4B is a plan view of a structure of the fingerprint image input device of the fingerprint recognition apparatus of the present invention and shows a shading tendency of a sensor signal in the case in which the present invention is not applied.

FIG. 4A is a perspective view of a fingerprint image input device of a fingerprint recognition apparatus of the present invention. FIG. 4B is a plan view of a structure of the fingerprint image input device of the fingerprint recognition apparatus of the present invention and shows a shading tendency of a sensor signal in the case in which the present invention is not applied.

As shown in FIG. 4B, one LED 202 for illumination is arranged in the vicinity of a center on each side in a vertical scanning direction of a solid-state image pickup element 201, such as a CMOS sensor, of a fingerprint image input device 200. A finger 100 is placed on the solid-state image pickup element 201, and light is irradiated on the finger 100 from the LEDs 202. The irradiated light is transmitted through or scattered in the inside of the finger to be incident on the solid-state image pickup element 201 side.

Then, the solid-state image pickup element 201 aligns a longitudinal direction of the finger with the vertical scanning direction of the sensor to take in a fingerprint image. At this point, in a central part in the vertical scanning direction and a horizontal scanning direction of the solid-state image pickup element, since light is transmitted through or scattered in the arrangement of the LEDs 202 and the inside of the finger to be incident on the solid-state image pickup element side, an amount of light is reduced in a part closer to the central part. When an image pickup element having a uniform opening shape of pixels as shown in FIG. 3 is used, a signal level of a sensor signal also falls in the central part. That is, in the solid-state image pickup element of FIG. 3, since opening shapes of pixels 10 are uniform in the plane and opening areas are uniform for all the pixels, and a distribution of an amount of light is thinner in a part closer to the central part in the case in which this image pickup element is used for the fingerprint image input device of FIGS. 4A and 4B, an output of the sensor signal falls and shading of a pixel signal as shown in FIG. 4B occurs.

Distortion of an image signal due to a shape and a position of a finger, unevenness of luminance and an illumination environment of a light source, or the like is called shading. In this embodiment, as described later, shading correction is performed by changing opening areas of pixels of the solid-state image pickup element 202 in accordance with the shading.

Figure 5:
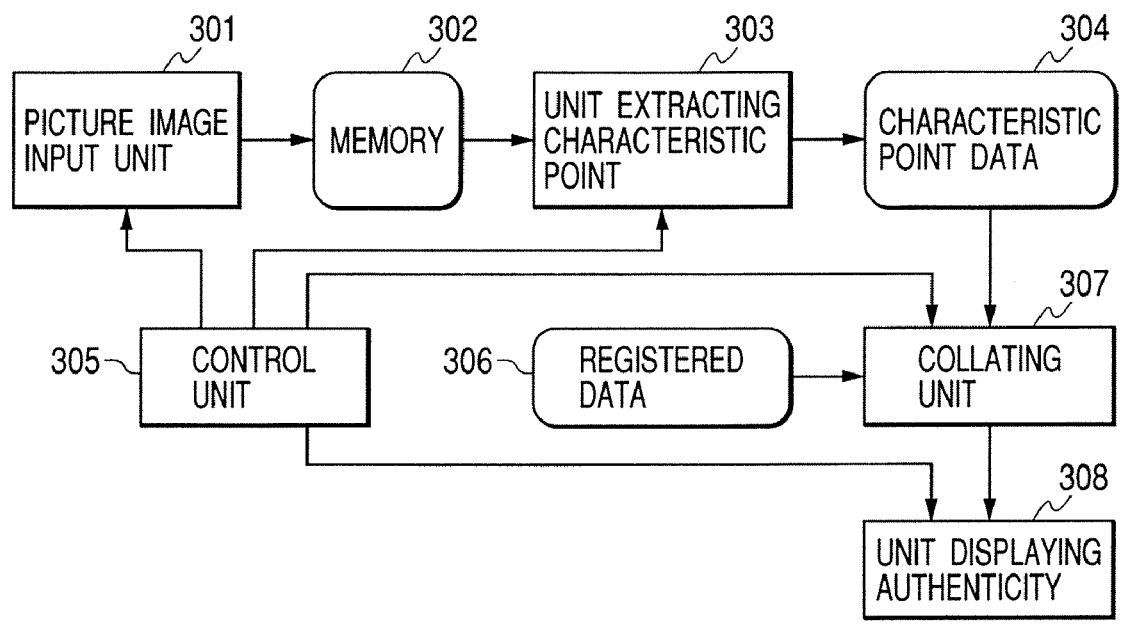
FIG. 5 is a block diagram showing a structure of an image recognition apparatus having a fingerprint image input device used in the first embodiment.

FIG. 5 is a block diagram showing a structure of an image recognition apparatus having a fingerprint image input device.

As shown in FIG. 5, image data of a fingerprint image inputted from a picture image input unit 301 serving as the fingerprint image input device of FIGS. 4A and 4B is temporarily stored in a memory 302. A unit extracting characteristic point 303 reads the picture image data from the memory 302 and processes it to extract a characteristic point, and stores the characteristic point in a unit storing characteristic data 304 as characteristic point data. The characteristic point data is represented by a coordinate position on rectangular coordinate axes in which an origin and coordinate axes of coordinates are determined arbitrarily every time the data is represented while keeping a scale of the coordinates identical (keeping a certain image of a fingerprint). Then, a distance between adjacent two characteristic points is calculated, which is simultaneously stored as characteristic point data.

This characteristic point data and characteristic point data of a fingerprint image stored in the unit storing registered data 306 in advance are collated in a collating unit 307. Authenticity of the characteristic data is displayed in a unit displaying authenticity 308 in a form of, for example, a graph. Reference numeral 305 denotes a control unit for sending a control signal to each unit.

If a fingerprint image taken in by the fingerprint image input device has shading as shown in FIG. 4B, it becomes difficult to extract a characteristic point, which causes a deficiency such as decrease in an authenticity ratio or malfunction.

In this embodiment, shading correction is performed by setting opening areas of pixels of the solid-state image pickup element in accordance with the shading.

Figure 1:
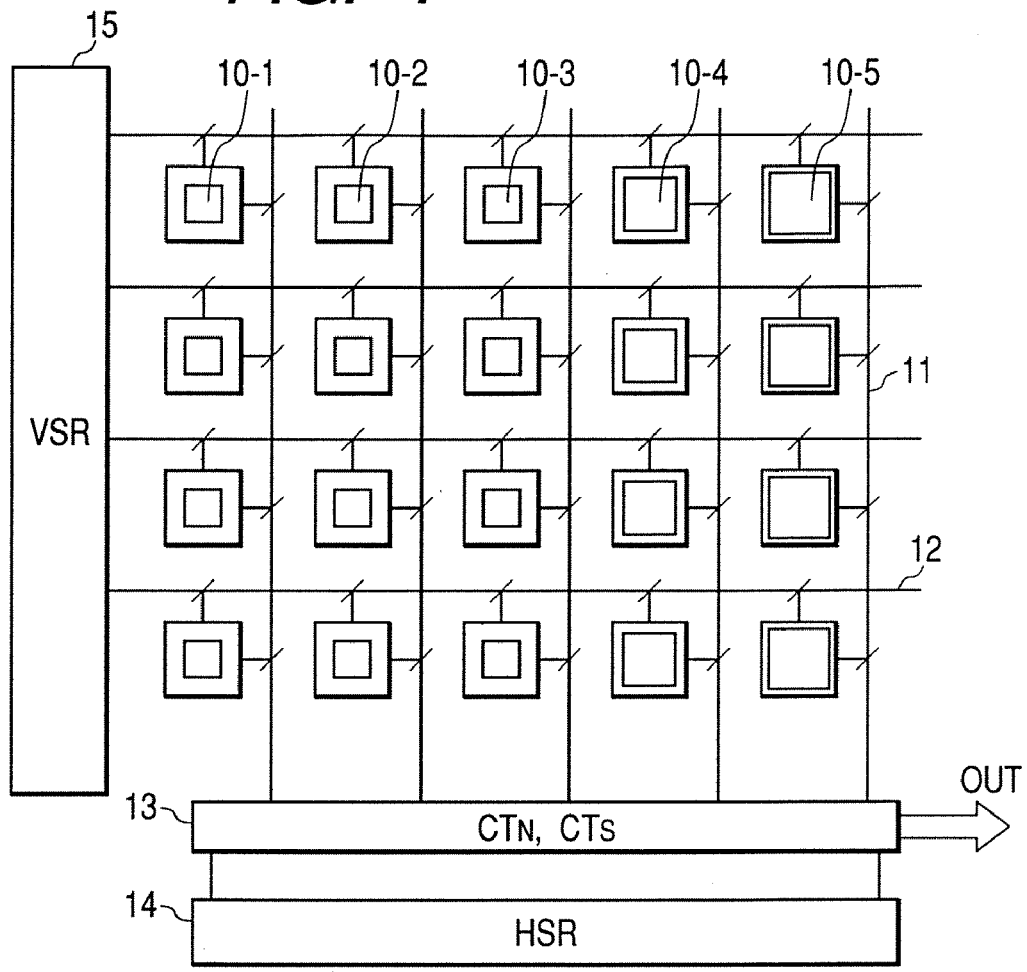
FIG. 1 is a diagram schematically showing a solid-state image pickup element used in a first embodiment.
Figure 2:
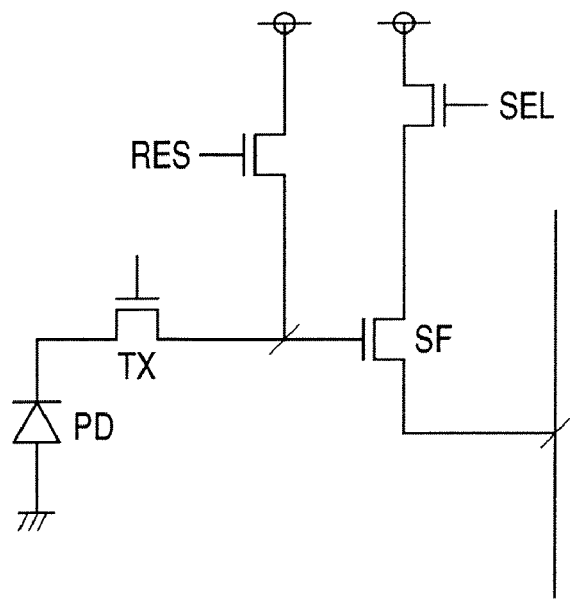
FIG. 2 is an equivalent circuit diagram of one pixel of a pixel portion of an image pickup element used in the first embodiment.

FIG. 1 is a diagram schematically showing a solid-state image pickup element used in this embodiment. FIG. 2 is an equivalent circuit diagram of one pixel of a pixel portion of the solid-state image pickup element. FIG. 3 is a diagram schematically showing a solid-state image pickup element to be a comparative example.

In this embodiment, as shown in FIG. 1, the pixel portion is constituted by pixels arranged in a matrix. A vertical shift register (VSR) 15 is operated to send a control signal to the pixel portion through horizontal signal lines 12, a charge signal from the pixel portion is transferred to a storage unit 13 via vertical output lines 11, and a pixel signal is sequentially outputted by a horizontal shift register (HSR) 14. The storage unit 13 stores a noise signal and a sensor signal in storage capacitors $CT_N$ and $CT_S$, respectively, which are provided for each vertical output line 11.

In addition, FIG. 2 is an equivalent circuit diagram of one pixel. Reference symbol PD denotes a photodiode serving as a photoelectric conversion portion for converting an optical signal into a charge; TX, a transfer transistor for transferring a charge signal from the photodiode PD; RES, a reset transistor for resetting a charge in a read path of the charge signal; SEL, a selection transistor for selecting a signal read line; and SF, a transistor for reading out the charge signal to the storage unit 13 with a source follower. A noise signal is read from the vertical output lines 11 in a state in which the transfer transistor TX is turned OFF and the reset transistor RES and the selection transistor SEL are turned ON. A sensor signal is read from the vertical output lines 11 after the noise signal is read in a state in which the transfer transistor TX is turned ON, the reset transistor RES is turned OFF, and the selection transistor SEL is turned ON. Then, a sensor signal having a noise component removed therefrom can be obtained by performing processing for subtracting the noise signal from the sensor signal.

Opening shapes of pixels of the pixel portion shown in FIG. 1 are those of the case in which shading in the sensor horizontal scanning direction shown in FIG. 4B is corrected. In accordance with the shading, opening areas of pixels 10-5 in a central part of the pixel portion are set large and opening areas of pixels 10-4, 10-3, 10-2, and 10-1 are sequentially set such that the opening areas become smaller toward a peripheral part of the pixel portion. In FIG. 1, a left half of the pixel portion is shown in the case in which the opening areas of the pixels are made smaller from the central part to a left end side of the pixel portion. In a right half of the pixel portion, the opening areas of the pixels are made smaller from the central part to a right end side of the pixel portion in the same manner. Note that the shading in the sensor vertical scanning direction shown in FIG. 4B can also be corrected by, in accordance with the shading, setting opening areas of pixels such that the opening areas of pixels in the central part of the pixel portion are large and become smaller toward the peripheral part thereof.

In this way, nonuniformity of distribution of an amount of light due to a shape and a position of a finger, unevenness of luminance and an illumination environment of a light source, or the like can be adjusted by manipulating opening areas, and shading correction can be performed without involving complicated image pickup conditions, change of drive timing, and a correction algorithm.

Although the opening areas of pixels of the pixel portion are changed in this embodiment, for example, shading correction can also be performed by changing a shape of a microlens provided on each pixel (opening portion) to change a light condensing ratio, or changing an impurity concentration in a photoelectric conversion region of a pixel to change photoelectric conversion efficiency in a photodiode portion.

It is mentioned, for example, in FIG. 4 of Japanese Patent Application Laid-Open No. 6-140612 that an amount of light is adjusted by changing a shape of a microlens. In the figure, a curvature of the microlens is changed so as to increase (such that a curvature radius decreases) from a central part toward an end side of the microlens. In this embodiment, to the contrary, a light condensing ratio can be changed by changing the curvature of the microlens so as to decrease (such that the curvature radius increases) from the central part toward the end side in accordance with shading.

Second Embodiment

In the first embodiment, shading correction is performed by changing an opening shape of a pixel portion. In this embodiment, shading correction is performed by controlling drive timing within a scanning time for one frame.

Here, control of storage time of a pixel portion is performed by an electronic shutter (rolling shutter).

Figure 6:
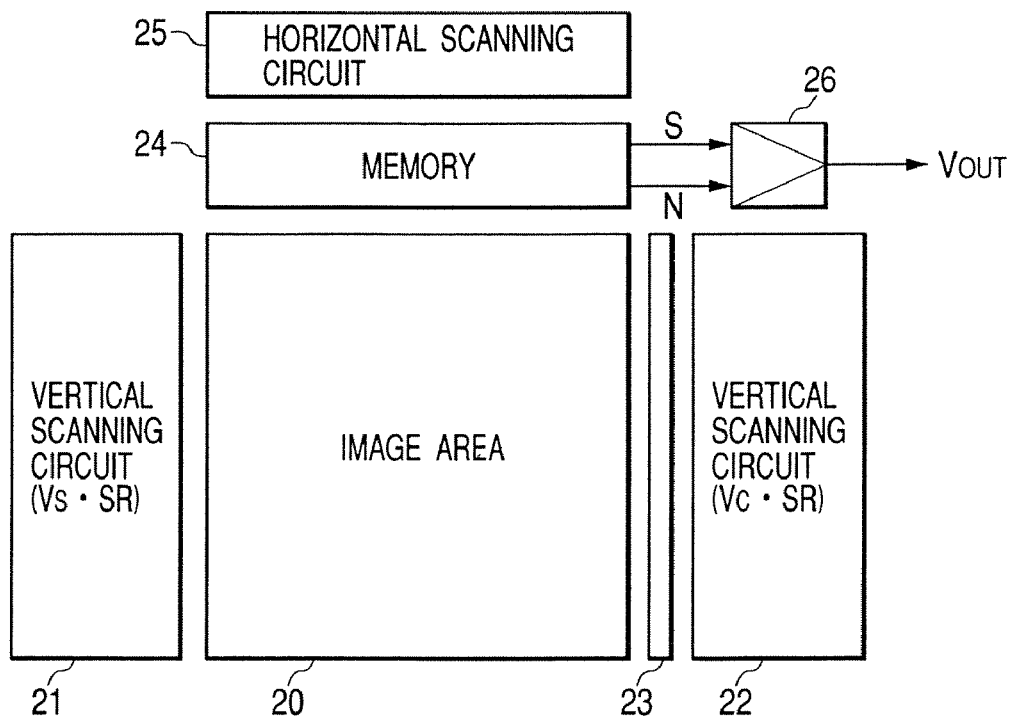
FIG. 6 is a diagram schematically showing a solid-state image pickup element used in the second embodiment.

FIG. 6 is a diagram schematically showing a solid-state image pickup element used in this embodiment. One pixel of the pixel portion has the same pixel structure as that shown in FIG. 2. In addition, opening shapes of pixels of a pixel area 20 are uniform for all pixels.

In FIG. 6, reference numeral 20 denotes a pixel area constituted by arranging a plurality of pixels; 21, a first vertical scanning circuit (Vs·SR) such as a shift register for sequentially selecting pixel rows to be read; 22, a second vertical scanning circuit (Vc·SR) such as a shift register for sequentially resetting pixel rows in order to start storage; 23, an entire pixel reset switch ($V_R$) for collectively resetting all pixels of the pixel area 20; 24, a memory for storing a noise signal and a sensor signal from the pixel area 20; 25, a horizontal scanning circuit for scanning the memory 24 for each pixel column in order to output the noise signal and the sensor signal from the memory 24; and 26, a differential amplifier for subtracting the noise signal from the sensor signal to output an output signal Vout.

Time from reset of a pixel to output of a signal, that is, storage time, can be controlled by providing the first vertical scanning circuit (Vs·SR) 21 such as a shift register for sequentially selecting pixel rows to be read and the second vertical scanning circuit (Vc·SR) such as a shift register for sequentially resetting pixel rows in order to start storage, and changing start time for a reset operation and a reading operation. This is called a rolling shutter.

Each pulse name corresponds to the equivalent circuit diagram of the part of the pixel portion shown in FIG. 2. An interval between reset and reading of a pixel becomes the storage time. Therefore, as shown in FIG. 4B, since light is transmitted through the inside of a finger to be incident on a sensor side in a central part in the vertical scanning direction of the pixel portion, in the case in which an amount of light is smaller toward the central part, scanning is performed with the first vertical scanning circuit 21 and the second vertical scanning circuit 22 such that the interval between reset and reading of a pixel is increased in the central part and decreased in a peripheral part of the pixel portion.

Figure 7A:
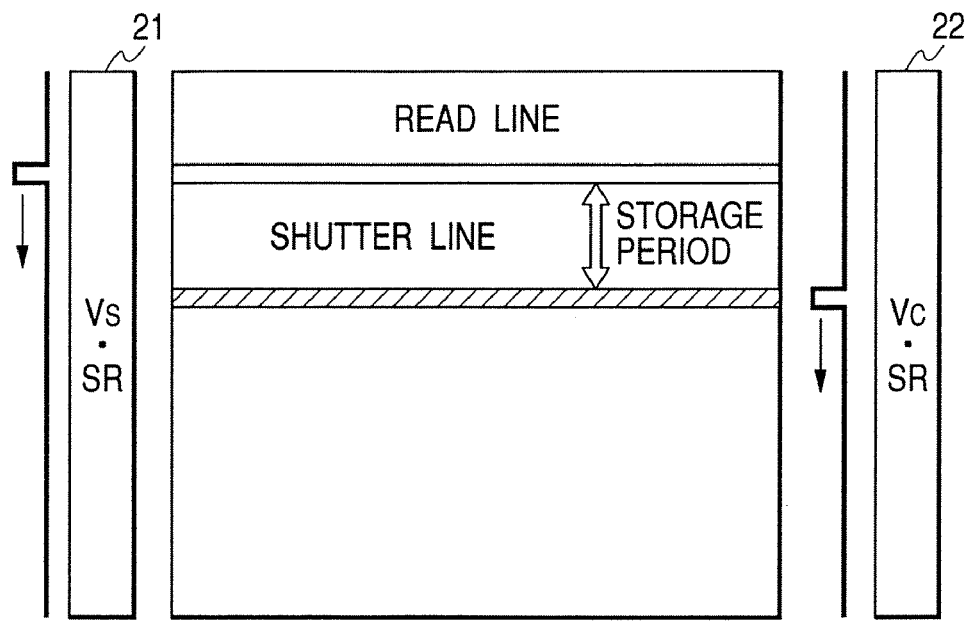
FIG. 7A is a partial schematic diagram of a solid-state image pickup element for explaining an operation of an electronic shutter pulse used in the second embodiment.
Figure 7B:
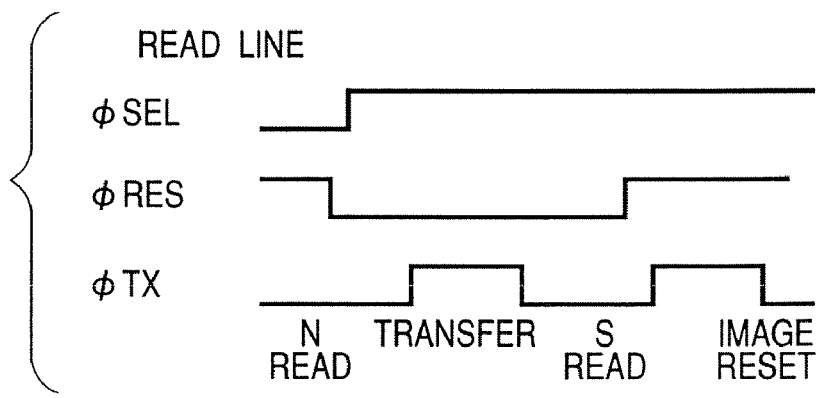
FIGS. 7B and 7C are timing charts for explaining the operation of the electronic shutter pulse used in the second embodiment.
Figure 7C:
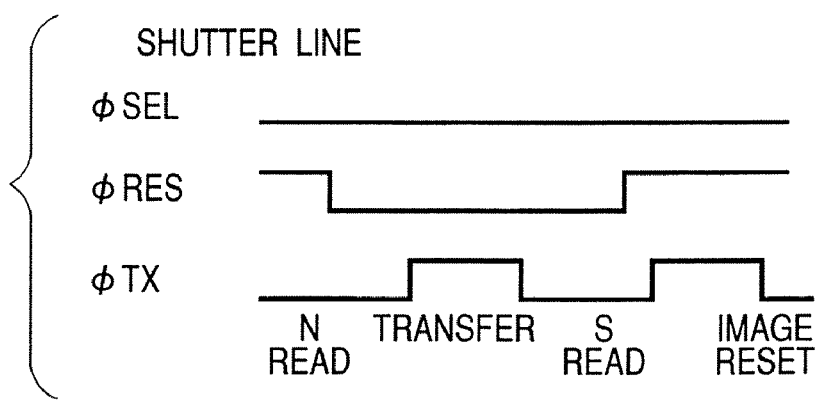

FIGS. 7A to 7C show operations of an electronic shutter. Each pulse name corresponds to the equivalent circuit of a part of the pixel portion shown in FIG. 2. First, in a pixel portion of a line selected by the second vertical scanning circuit (Vc·SR) 22 shown in FIG. 7A (in this case, this line becomes a shutter line), as indicated by an operation pulse shown in FIG. 7C, pixels are reset after pulses φRES and φTX are applied and noise read (N read) and signal read (S read) are performed in the same manner as the usual operation. However, since the selection pulse φSEL is in a low level, a noise signal and a sensor signal are not outputted to the vertical output line from the pixels.

Next, the same line is selected by the first vertical scanning circuit (Vs·SR) 21 which performs scanning with a delay from the scanning performed by the second vertical scanning circuit 22 (in this case, this line becomes a read line). In a pixel portion of the selected line, as indicated by an operation pulse shown in FIG. 7B, pulses φRES and φTX are applied and noise read (N read) and signal read (S read) are performed by the usual operation. Here, since the selection pulse φSEL is in a high level, a noise signal N and a sensor signal S (including a noise component) are outputted to the vertical output line from the pixels, respectively. Finally, an S-N signal subjected to processing for subtracting the noise signal from the sensor signal is outputted from a differential amplifier.

Therefore, time from pixel reset in the shutter line operation to transfer in the read line operation becomes the storage time. Thus, the storage time can be varied by controlling an interval from the time when each horizontal line is selected as a shutter line until the time when it is selected as a read line.

Next, operations of the shift register to be the vertical scanning circuit will be described using FIG. 8.

The shift register starts the second vertical scanning circuit (Vc·SR) 22 for performing a reset operation according to a start pulse VcST, and resets pixel rows sequentially according to a pulse φVc. Next, with a delay from the start of the second vertical scanning circuit (Vc·SR) 22, the shift register starts the first vertical scanning circuit (Vs·SR) 21 for performing a read operation according to a start pulse VsST to perform a read operation for each pixel row according to a pulse φVs. In this case, hatched parts of the pulse φVs in FIG. 8 indicate intervals in which storage time for other rows is intentionally made longer compared with an interval (storage time of a first row) between Vc1 and Vs1.

As shown in FIG. 8, the interval is gradually increased from a start side in the vertical scanning direction toward a central part of the pixel portion and, on the contrary, the interval is made smaller from the central part toward a completion side in the vertical scanning direction.

Storage time of each horizontal line is an interval from reset to reading, such as between Vc1 and Vs1 or Vc2 and Vs2, and can be set such that a reset-reading interval in a pixel row in a peripheral part of the pixel portion is short and a reset-reading interval in a pixel row in the central part thereof is long.

Figure 9:
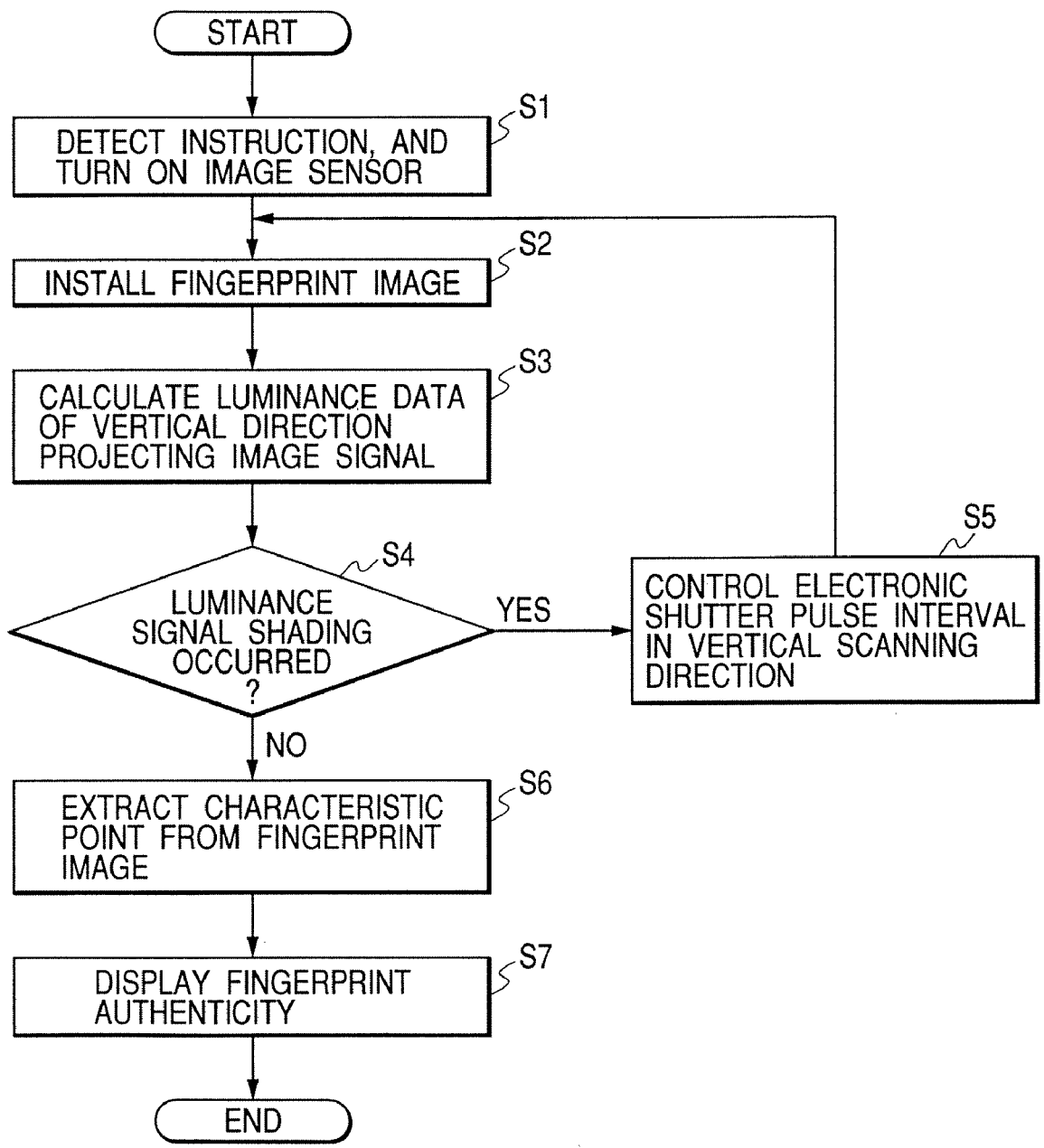
FIG. 9 is an operation flowchart for performing shading correction used in the second embodiment.

FIG. 9 shows an operation flowchart for performing the shading correction. First, it is detected that a finger is placed on an image pickup element and the image pickup element is turned on (step S1) to take in a fingerprint image once (step S2). The image thus taken in is projected in the vertical direction to obtain data, based upon which change in amplitude of a luminance signal is calculated. (step S3) and it is judged whether shading has occurred (step S4). Then, if it is judged that shading has occurred, vertical scanning is controlled such that an interval between reset and reading of a pixel is large in a part where a signal amplitude is small and the interval between reset and reading of a pixel is small in a part where the signal amplitude is large (step S5), and the fingerprint image is installed again (step S2). Upon taking in of an image of a level at which it is possible to determine that there is no shading, the operation proceeds to the next step, and extraction of a characteristic point is performed (step S6). Then, the operation advances to an authenticity operation, and an authenticity of a fingerprint, that is, whether or not authenticity of a subject has been verified is displayed (step S7).

In this way, the interval between reset and reading of a pixel is controlled such that the storage time is long in the central part and is short in the peripheral part, whereby shading in the sensor vertical scanning direction can be corrected.

In addition, it is also possible to combine the first embodiment and the second embodiment to correct shading in both the sensor horizontal scanning direction and the sensor vertical scanning direction, respectively, thereby obtaining a more optimized sensor signal.

As described above in detail, according to the present invention, simplification of processing and reduction in costs can be realized without the need to perform correction of an image signal with a complicated algorithm or a large-scale correction circuit.

What is claimed is:

1. An image pickup apparatus comprising:
   an irradiating means that irradiates light on an object of image pickup;
   an image pickup element that comprises a pixel having a photodiode (PD) that receives light reflected from or transmitted through said object of image pickup, and that generates an electric signal according to an amount of received light,
   a transfer transistor (TX) for transferring the electric signal from the photodiode, a reset transistor (RES) for resetting the electric signal and a transistor (SF) for reading out the electric signal; and
   control means that controls a length of a period of time between reset and reading of a pixel row within one frame scanning period of time, so that the length of period of time between the reset and the reading of the pixel row receiving a larger quantity of light is shorter than that of another pixel row receiving a smaller quantity of light,
   wherein a storage time is controlled by controlling the image pickup element with an electronic shutter, for each horizontal line of the image pickup element, to correct shading during a driving of the image pickup element, and
   wherein the image pickup apparatus further comprises a differential unit for reading the electric signal (S) and also reading a noise signal (N) before reading the electric signal, and for subtracting the noise signal (N) from the electric signal.

2. An image pickup apparatus according to claim 1, wherein the reset and the reading operations are performed by different scanning units.

3. A fingerprint recognition apparatus having an image pickup apparatus according to claim 2 as a fingerprint image input means.

4. A fingerprint recognition apparatus having an image pickup apparatus according to claim 1 as a fingerprint image input means.

* * * * *